Feb. 11, 1958  K. H. MORGANSTERN  2,822,776
CARGO VESSEL

Filed May 24, 1956  5 Sheets-Sheet 1

INVENTOR.
Kennard H. Morganstern
BY Howard L. Rose
Attorney

Feb. 11, 1958  K. H. MORGANSTERN  2,822,776
CARGO VESSEL

Filed May 24, 1956  5 Sheets-Sheet 2

INVENTOR.
Kennard H. Morganstern
BY Howard L. Rose
Attorney.

Feb. 11, 1958

K. H. MORGANSTERN

2,822,776

CARGO VESSEL

Filed May 24, 1956

INVENTOR.
Kennard H. Morganstern

BY
*Howard L. Rose*
Attorney

United States Patent Office 2,822,776
Patented Feb. 11, 1958

2,822,776

CARGO VESSEL

Kennard H. Morganstern, Roslyn, N. Y., assignor to Nuclear Corporation of America, Inc., New York, N. Y., a corporation of Michigan Application May 24, 1956, Serial No. 587,169

12 Claims. (Cl. 114—.5)

The present invention relates to cargo vessels intended to carry foodstuffs and, in particular, to a cargo vessel having apparatus disposed in its hold for irradiating foodstuffs with the emanations from radio-active materials.

In recent years there has been a considerable increase in the treatment of foodstuff by irradiation with emanations from radio-active materials to control disease, rot and other deleterious effects resulting from growth of bacteria, fungus, and other microscopic plant and animal life. The irradiation of foodstuffs is further employed to delay germination of grains and the sprouting of such foods as potatoes and onions. In the normal course of commerce, the foods to be irradiated are transported to a processing plant specially equipped for this purpose and after treatment are distributed through normal channels to the market place. The delay in arrival of the foodstuffs at the market place necessitated by the irradiation treatment represents a financial loss to the shipper and in order to minimize this delay and the consequent financial loss, equipment must be employed at the processing plant which insures rapid but adequate treatment of the foodstuffs. Consequently, substantial amounts of high energy radio-active material are employed so as to subject the foodstuffs to highly concentrated, high energy emanations, thereby completing the treatment in a minimum of time. Such a procedure necessitates the utilization of expensive radio-active materials and further increases the cost of treatment because of the need for a high degree of shielding to protect plant personnel and others in the vicinity of the plant. Although the invention is described as particularly applicable to treatment of foodstuffs, it is within the scope of the present invention to treat other materials which may be beneficially effected by irradiation.

It is an object of the present invention to provide a cargo vessel having apparatus disposed in its hold for irradiating foodstuffs while in transit through normal trade channels.

It is another object of the present invention to equip a cargo vessel with apparatus for irradiating foodstuffs so as to reduce shielding problems in consequence of the shielding inherently provided by the water through which the ship is proceeding.

It is yet another object of the present invention to equip a cargo vessel with apparatus for irradiating foodstuffs and other substances so that relatively long periods of time are available for treatment, and therefore small amounts of low activity and, consequently, economical radio-active materials may be employed.

Still another object of the present invention is to provide apparatus in the hold of a cargo vessel for subjecting foodstuffs to emanations from radio-active material wherein the radio-active material employed may be the waste material from atomic piles.

Another object of the present invention is to provide apparatus in the hold of a cargo vessel for treating foodstuffs with emanations from radio-active material wherein the radio-active material may be safely stored during loading and unloading of the cargo and may be readily distributed throughout the hold when it is desired to treat the cargo.

It is another object of the present invention to equip the hold of a cargo vessel with apparatus for treating foodstuffs with emanations from radio-active material and to provide radio-activity detecting apparatus for preventing opening of the hatchways to the hold when the radio-activity therein is sufficiently high to be dangerous to humans.

It is another object of the present invention to equip a cargo vessel with apparatus for irradiating foodstuffs wherein the apparatus includes a plurality of hollow arms distributed throughout the hold and connected to a container of capsules of low activity radio-active material, wherein the container is disposed below the water line of the vessel and wherein the utilization of low activity radio-active material and the disposition of the container below the vessel's water line minimizes the amount of shielding material required.

It is another object of the present invention to provide a cargo vessel with apparatus disposed in the hold of the vessel for irradiating foodstuffs disposed in its hold wherein low activity radio-active material may be employed as a result of the relatively long treatment times provided during movement of the vessel from its point of departure to its destination and wherein the utilization of low activity radio-active material and the inherent shielding provided by the water through which the vessel is proceeding minimizes the shielding problem.

It is another object of the present invention to equip a cargo vessel with a plurality of hollow arms distributed throughout the hold and connected to a container of capsules of radio-active material and to provide means to effect irradiation of the foodstuffs by distributing the capsules throughout the arms and, subsequently, to terminate the irradiation treatment and render the hold safe for personnel by returning the capsules to the container.

It is another object of the present invention to equip the hold of a cargo vessel with a plurality of hollow arms distributed throughout the hold and connected to a container of capsules of radio-active material and to render the system active and, subsequently, render it inactive and completely safe by respectively filling the apparatus with water and draining the apparatus of water.

It is another object of the present invention to equip a cargo vessel with apparatus for irradiating foodstuffs with the emanations from radio-active material, which apparatus may employ low activity radio-active material, requires a minimum of moving parts, requires no complex control equipment and may be rapidly and easily rendered safe for personnel by draining or pumping water out of the apparatus.

The above and still further features, objects and advantages of the invention will become apparent upon consideration of the following detailed description of several specific embodiments of the invention, especially when taken in conjunction with the accompanying drawings, wherein.

Figure 1:
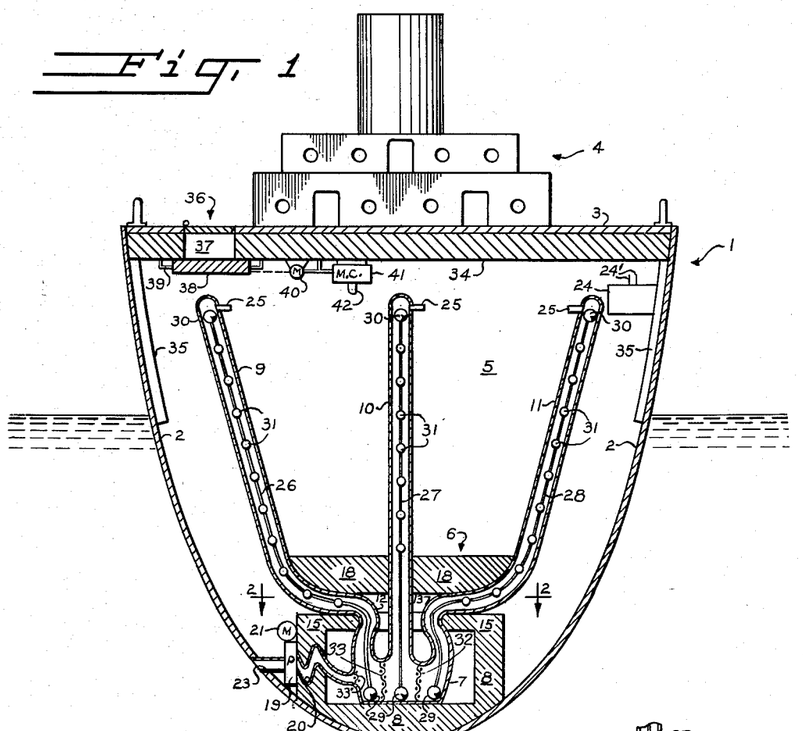
Figure 1 is a view in cross-section of one embodiment of the present invention taken transverse to the keel of a vessel.
Figure 2:
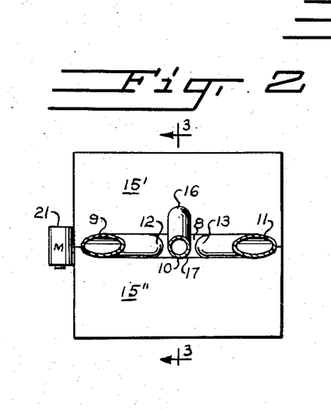
Figure 2 is a view taken along section 2—2 of Figure 1.
Figure 3:
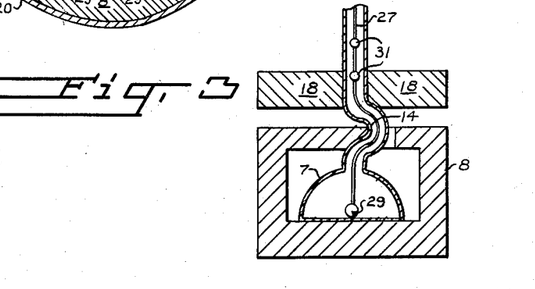
Figure 3 is a view in cross-section taken transverse of the apparatus illustrated in Figure 1.

Referring specifically to Figures 1–3 of the accompanying drawings, a cargo vessel generally designated by the reference numeral 1 has a hull 2, an upper deck 3 and a superstructure 4 secured to the upper deck 3. The space enclosed between the hull 2 and the upper deck 3, is designated as the hold 5 of the vessel 1 and has situated therein apparatus 6 for irradiating foodstuffs carried in the hold, with the emanations from radio-active material. A container 7 is located in the lower section of the hold 5 below the water line of the vessel 1 and is positioned centrally of the transverse dimension of the vessel 1. The bottom and sides of the container 6 are enclosed within a solid block 8 of shielding material, such as lead, situated in the bottom of the hold 5 and having a central opening in the top surface. Three hollow arms 9, 10 and 11 communicate with the interior of the container 7, the arm 9 extending vertically upward through the transverse center of the hold 5 and the arms 9 and 11 sloping upwardly and outwardly on either side of the arm 10 and being displaced therefrom by approximately two-thirds the distance between the arm 10 and the hull 2. The arms 9 and 11 communicate with the container 7 through S-shaped portions 12 and 13 of the pipes 9 and 11 respectively. The pipe 10 is also provided with an S-shaped portion 14, illustrated in Figures 2 and 3, which is parallel to the keel of the vessel 1 and, therefore, not visible in Figure 1. The S-shaped portions 12 and 13 are so arranged that the upper curved section of each provides an inwardly directed concave outer surface, the terms "inwardly" and "outer" indicating positions relative to the vertical transverse center line of the block 8. The block 8 of shielding material has an inwardly directed horizontal peripheral flange 15 which extends into contact with all surfaces of the pipes 9, 10 and 11 horizontally aligned with the concave outer surfaces of the S-shaped portions 12, 13 and 14 except those located in a direct line between the pipes, the lower curved section of the S-shaped portions extending under the flange 15. The flange 15 is illustrated in Figure 1 as integral with the block 8. However, in order to facilitate assembly of the apparatus, the flange 15 may be formed as two separate plates 15' and 15" as illustrated in Figure 2 of the accompanying drawings, each covering approximately one-half of the upper surface of the block 8. The plate 15' is provided with a recess 16 to accept the convex surface of the upper bend of the S-shaped portion 14 of the pipe 10 and the plate 15" is provided with a projection 17 which engages the concave surface of the upper bend of the S-shaped portion 14. The plates 15' and 15" may be bolted or otherwise secured to the upper surface of the block 8 after the container 7 has been placed therein and the S-shaped portions 12, 13 and 14 secured to the container 7. Although the members 12, 13 and 14 are described and illustrated as S-shaped members, other curved surfaces may be employed in the apparatus of the present invention so long as they provide a concave surface into which the flange 15 may extend. A horizontal circular plate 18 surrounds the pipe 10 and is of such a diameter as to engage the surfaces of the pipes 9 and 11 adjacent pipe 10. The plate 18 is disposed adjacent the upper surface of the flange 15 so as to contact the pipes 9, 10 and 11 above their respective S-shaped portions 12, 13 and 14. The purpose for the portions 12, 13 and 14, the flange 15 and the plate 18 will become apparent as the description proceeds.

The container 7 and the arms 9, 10 and 11 are adapted to be filled with water supplied thereto by a reversible pump 19, conventionally illustrated. The pump 19 is positioned adjacent the block 8 and communicates with the container 7 through an S-shaped pipe 20 extending through the block 8. The pump 19 is driven by a reversible electric motor 21, conventionally illustrated, which receives power over leads 22. The motor 21 and pump 19 are employed to draw water from the water surrounding the vessel 1 through a pipe 23 and fill the arms 9, 10 and 11 and the container 7 or to withdraw water therefrom and dispose of it through a pipe 23. In order to insure complete filling of arms 9, 10 and 11 with water and further to prevent overfilling of these arms, a liquid level detector 24 is provided adjacent the upper end of the arm 11, and is connected over leads 24' to the circuit illustrated in Figure 4, to maintain the motor 22 energized until the arm 11 is filled with water. The detector 24 may be associated with any of the arms 9–11 but preferably cooperates with the arm furthest removed from the container 7 which is normally the last arm to be filled. A two way air-valve 25 is provided at the end of each pipe 9, 10 and 11 to allow the escape of air upon filling of the system and to permit the reentry of air upon draining the system.

Disposed within the container 7 are three strings or light weight thread-like members 26, 27 and 28 having one end maintained in the bottom of the container 7 by means of weights 29, secured thereto, the other end of each of the strings having a float 30 secured thereto. Disposed along the length of each of the strings 26, 27 and 28 are a plurality of capsules 31 containing low activity radio-active material, the capsules 31 normally being buoyant in water although this is not essential since the floats 30 may be of sufficient buoyancy in water to raise an entire string of capsules 31 regardless of whether they are buoyant or not. In the event the capsules 31 are buoyant, the floats 30 may be eliminated. The strings of capsules may be placed in the arms 9, 10 and 11, after assembly of the apparatus through apertures in the upper ends of the arms or the upper ends of the arms may be provided with screw caps that may be removed when placing the strings in the arms or when strings already in the arms are to be replaced.

The container 7 is divided into three compartments by two screens 32 and 33 which extend vertically from the bottom of the container 7 to the junctions of the arms 9 and 10 and 10 and 11 respectively. The screens 32 and 33 do not interfere with the flow of water in the system but maintain the strings 26, 27 and 28 separated so that they do not become entangled when the system is drained and the strings 26, 27 and 28 are disposed on the bottom of the container 7. Further, the screens 32 and 33 insure that upon filling of the system with water each of the strings 26, 27 and 28 proceeds upwardly through their respective arms 9, 10 and 11. A screen 33' is placed across the entrance of the pipe 20 into the container 7 to prevent the string 26 from being drawn into the pipe 20 when the system is drained.

The underside of the deck 3 is provided with a shield 34 of lead or similar material suitable for protecting the ship's company from emanations from the radio-active material contained in the capsules 31. The inner sides of the hull 2 may, as a safety precaution, be provided with a shield 35 which extends from the shield 34 approximately to the water line of the vessel 1.

Figure 4:
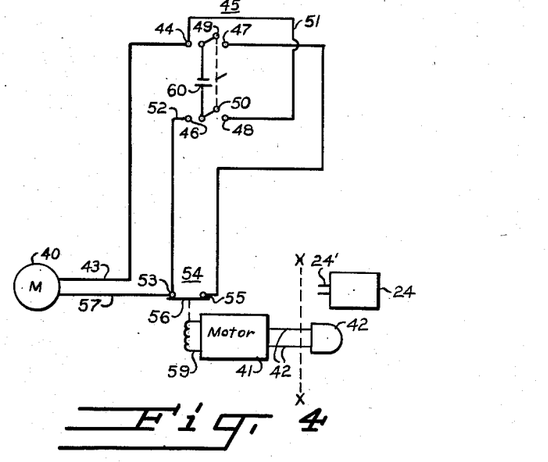
Figure 4 is a partially schematic and partially block wiring diagram of a motor control circuit employed in the present invention.

The vessel 1 has hatchways 36, only one of which is illustrated in Figure 1, to permit access to the hold 5, the shield 34 having an aperture 37 communicating with the hatchway. The foodstuffs are delivered to the hold 5 through the hatchways 36, the arms 9, 10 and 11 being disposed in the hold so as to be surrounded by the foodstuffs thereby insuring adequate irradiation thereof. To prevent emanations from proceeding through the aperture 37 in the shield 34 and through the hatchway 36 when the level of radio-activity in the hold is dangerous, a horizontally slidable plate 38 of shielding material is disposed adjacent the lower surface of the shield 34 and is adapted to cover the aperture 37 when the emanations from the hold 5 are of sufficient intensity to injure humans. The plate 38 is slidably supported on a plurality of guides 39, only one of which is illustrated in Figure 1, and is reciprocated to an aperture opening or closing position by a reversible electric motor 40. In order to prevent removal of the plate 38 from across the aperture 37 when the level of radio-activity in the hold 5 is dangerously high, a control circuit 41, including a radio-activity detector 42, is provided which prevents energization of the motor 40 in such a sense as to remove the plate 38 from the aperture 37. The control circuit 41, however, does not prevent the motor 40 from moving the plate 38 to the aperture closing position. The circuit, for accomplishing this result, is illustrated in Figure 4 wherein the reversible electric motor 40 is connected over a first lead 43 to a stationary contact 44 of a double-pole double-throw switch 45. The switch 45 further comprises stationary contacts 46, 47 and 48 and movable contacts 49 and 50. The movable contacts 49 and 50 are mechanically coupled togther and in their two positions engage the stationary contacts 44 and 46, and 47 and 48 respectively. The contacts 44 and 48 are connected together over a lead 51 and the contact 46 is connected over a lead 52 to a stationary contact 53 of a solenoid-activate switch 54. The switch 54 further comprises a stationary contact 55 and a movable contact 56 adapted to engage the contacts 53 and 55 simultaneously to close the switch 54. The contact 53 is connected over a second input lead 57 to the motor 40 and the contact 55 is connected over a lead 58 to the contact 47 of switch 45. The movable contact 56 of switch 54 is controlled by a solenoid 59 connected in the output circuit of the motor control circuit 41. The operation of the radio-activity detector 42 and the control circuit 41 is conventional and well known in the art, the detector 42 being connected over leads 42' to supply voltage to the circuit 41 upon detection of emanations from radio active material. Upon detection of excessive or dangerous radio-activity, the detector 42 supplies a voltage to the control circuit 41 sufficient for the latter to develop an output current of a magnitude to cause the solenoid 59 to attract its armature and, consequently, open the switch 54. The motor 40 receives energy from a source of electrical energy, conventionally illustrated as a battery 60, connected between the movable contacts 49 and 50 of the switch 45. Upon closing of the switch 45 to a first position such that contacts 49 and 50 engage contacts 44 and 46 respectively, the motor 40 rotates in a direction to move the plate 38 over the aperture 37 in the shield 34. Since when the switch 45 is in the first position, the switch 54 is by-passed, the control circuit 41 has no effect upon the circuit. Upon movement of the switch 45 to a second position with the contacts 49 and 50 engaging the contacts 47 and 48 respectively, the polarity of the electrical energy supplied to the motor 40 by the battery 60 is reversed and the motor 40 runs in a direction to remove the plate 38 from across the aperture 37. However, if the level of radioactivity in the hold 5 is too high as determined by the detector 42 and control circuit 41, the circuit to the motor 40 is opened at the switch 54 and the motor remains deenergized. Consequently, the plate 38 cannot be removed from the aperture 37 when there is any danger to personnel from radioactivity in the hold although it may always be energized to close the aperture with the plate 38.

The control circuit for the motor 21 which drives the pump 19 is identical with the circuit illustrated in Figure 4 for the motor 40 except that the radio-activity detector 42 is replaced by the liquid level detector 24. The detector 24 is connected by means of leads 24' to the leads 42' at the point indicated by the line x—x in Figure 4. The motor 21 may always be energized to drain the system but when rotating in a direction to fill the system, the circuit 41 deenergizes the motor 41 when liquid is sensed by detector 24 in the upper end of the arm 11.

Whenever the vessel 1 is in port or at any time personnel must have access to the hold 5, the container 7 and arms 9, 10 and 11 are drained of water by the pump 19 and the strings 26, 27 and 28 to which the capsules 31 are attached, are disposed on the bottom of the container 7. It will be noted that when the capsules 31 are lying on the bottom of the container 7 there is no direct path for the emanations from the radio-active material from the interior of the container 7 to the hold 5. The arrangement of the S-shaped portions 12, 13 and 14 of the pipes 9, 10 and 11, the flange 15 of the block 8 and the plate 18 insure that sufficient shielding material is interposed between the bottom of the container 6 and the hold 5 to reduce the radio-activity in the hold 5 to a harmless level regardless of the path followed by the emanations. This arrangement makes it possible to activate or deactivate the apparatus without employing sliding shields or other heavy and complex equipment, by simply supplying water to or drawing water from the system. Once the apparatus is installed, it is substantially foolproof since all components are fixed members except for the motor 21 and pump 19. It should be noted that the S-shaped pipe 20 interconnecting the pump 19 and container 7 serves the same purposes as the S-shaped portions 12, 13 and 14 of the pipes 9, 10 and 11; that is, it allows sufficient shielding material to be interposed between the container 7 and the hold 5 to reduce the emanations in the latter to a safe level. Of course, the material from which the pipes 9, 10 and 11 and the hull 2 are fabricated must have substantially no residual radio-activity but this presents no problem since many such materials are well known and readily available.

Upon filling of the container 7 and the pipes 9, 10 and 11 with water, by means of the pump 19 and motor 21, the strings 26, 27 and 28 are carried up into the pipes 9, 10 and 11 by the floats 30. The cargo carried by the vessel 1 in the hold 5 is disposed about the pipes 9, 10 and 11 and, therefore, is subjected to irradiation by the radio-active material in the capsules 31. The capsules 31 and float 30 are preferably spherical in shape so that when the system is drained, they may roll down the pipes and back into the container 7.

It is apparent from the above that the apparatus of the present invention provides a system which is safe, economical and efficient. Upon drainage of the apparatus the radio-active material returns to the container 7 and is encompassed by sufficient shielding material to render the hold 5 safe for personnel, and the hold 5 may be filled with foodstuffs, foodstuffs may be removed or personnel may work in the hold 5. After the vessel 1 has left port, the container 7 and the arms 9, 10 and 11 may be filled with water to raise the strings 26, 27 and 28 in the arms 9, 10 and 11 so as to subject the foodstuffs disposed in the hold 5 to radiations from the radio-active material in the capsules 31. Inasmuch as transportation by water is relatively slow, considerable time is available for treatment of the foodstuffs and relatively small concentrations of low activity radio-active material may be employed. Such low activity material may be the waste products from atomic piles and, therefore, is inexpensive. Further, the employment of low activity material allows relatively little shielding to be utilized and eliminates the need for complex control equipment required where high energy materials are employed. An additional advantage of the combination of the present invention is that the water surrounding the majority of the hull 2 of the vessel 1 provides adequate shielding for the low energy emanations from the radio-active material when the vessel 1 is at sea and passes other vessels only at relatively great distances. When the vessel is in port, the location of the container 7 well below the water line insures a high degree of shielding by the surrounding water and minimizes the amount of shielding required of the block 8. The shield 35 disposed on the inner surface of the hull 2 between the deck 3 and the water line is not essential since emanations proceeding through this section of the hull are directed away from the vessel 1 and its personnel and, therefore, constitute no threat to their safety. The shield 35 may be employed, however, to prevent injury to personnel on passing vessels although this threat is not great since the system may be rapidly drained of water by the pump 19 and rendered harmless. A further advantage of the apparatus of the present invention is that the foodstuffs are not detoured from their normal trade channels for purposes of the irradiation treatment. The foodstuffs, to be treated, flow through normal trade channels to the vessel on which they are to be transported and are treated in transit with no resulting delay in their movement to market. Consequently, the apparatus of the present invention materially reduces the cost of irradiation of foodstuffs in that a relatively inexpensive installation may be employed which utilizes an economical source of radiations, a minimum of shielding, no complex equipment, a minimum of moving parts and requires no delay in shipping the food to market.

The apparatus 6, illustrated in Figure 1 of the accompanying drawings, employs three hollow arms 9, 10 and 11 for distributing the capsules through the foodstuffs at a given longitudinal position in the hold of the vessel 1. It is not intended to limit the invention to the utilization of a specific number of arms, the number of arms employed in a particular installation depending upon the width of the vessel, the required concentration of the irradiating emanations, the desired space pattern of emanations, and the like. Further, although the present invention is described as employed for irradiating foodstuffs, the invention is not limited to employment with a particular class of substances, and the apparatus disclosed may be employed in conjunction with any materials it is desired to treat with emanations from radioactive material.

The apparatus 6, illustrated in Figure 1 of the accompanying drawings, is adapted to irradiate foodstuffs at only a single station; that is, in only a relatively small space around the apparatus 6. In accordance with one embodiment of the present invention, illustrated in Figure 5 of the accompanying drawings, plural stations, similar to the apparatus 6 of Figure 1 and generally designated by the reference numerals 6', 6" and 6"', are disposed at spaced intervals along the length of the vessel 1. The spacing between the stations 6', 6" and 6"' taken in conjunction with spacing between the pipes of each is such that a space-field pattern of emanations is established that is adequate to complete treatment of the foodstuffs in a reasonable time. Each of the stations 6', 6" and 6"' may be provided with a separate pump 19 but preferably, as illustrated with respect to stations 6" and 6"' a single pump 19 may be employed for all of the stations.

Figure 5:
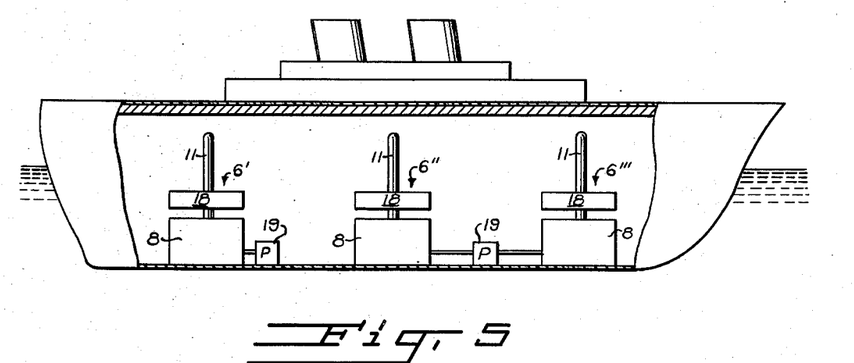
Figure 5 is a view of another embodiment of the invention illustrating an arrangement of the apparatus of Figure 1 along the length of the vessel.

The embodiment of the invention illustrated in Figure 5 of the accompanying drawings provides a relatively simple solution to the problem of irradiating foodstuffs throughout the hold 5. However, this arrangement is expensive in that several distinct and substantially independent stations must be employed. In a second embodiment of the present invention, illustrated in Figures 6 and 7 of the accompanying drawings, a single station 61 is employed for irradiating foodstuffs disposed throughout the hold 5. A container 62 is disposed in a block 63 of shielding material and has three hollow arms 64, 65 and 66 extending upwardly therefrom. The arm 65 extends vertically upward while the arm 64 slopes upwardly toward the stern of the vessel 1 and the arm 66 slopes upwardly toward the bow of the vessel 1. Each of the arms 64, 65 and 66 is connected to the container 62 through S-shaped hollow members 67, 68 and 69. Each of the arms 64, 65 and 66 is elongated transverse to the keel of the vessel 1, as seen in Figure 7, and extends across the majority of this dimension. The arms 64, 65 and 66 carry a plurality of strings 70 having one end secured to a float 71 and having its lower end secured to a weight disposed in the bottom of the container 62. As in Figure 1 each of the strings 70 carries a plurality of spaced capsules 31 of radio-active material. The container 62 is divided into three compartments by screens 72 and each of the arms is divided into as many sections as there are strings 70 per arm by screens 73, the screens 72 and 73 preventing entanglement of the various strings. The container 62 and arms 64, 65 and 66 are adapted to be filled with water or drained of water by a motor driven reversible pump 74 connected to the bottom of the container by an S-shaped pipe 75. Upon filling the system with water, each of the strings 70 rises into its respective section as defined by the screens 72 and 73 and subjects the foodstuffs to emanations from the radioactive material contained in the capsules 31. In this embodiment of the invention each string 70 is free to move in its associated arm a considerable distance in a direction transverse to the keel. Consequently, as the vessel 1 rolls, the strings 70 away back and forth thereby providing an even distribution of the emanations throughout the hold 5. Although each of the arms 64, 65 and 66 is illustrated as a single arm elongated transverse to the keel of the vessel 1, it is within the scope of the present invention to replace each arm with a plurality of circular arms of the type illustrated in Figures 1 to 3 or a plurality of separate and transversely spaced arms each elongated transverse to the keel.

Figure 6:
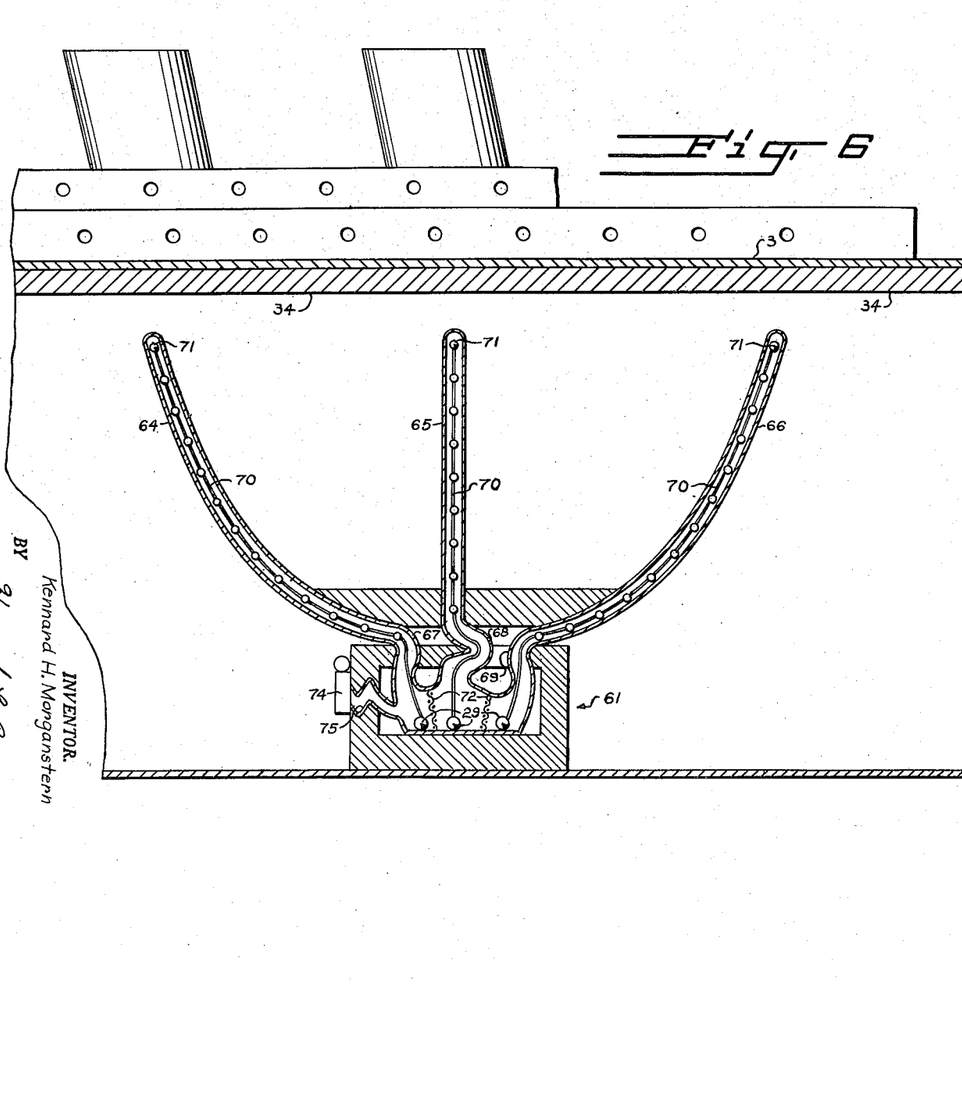
Figures 6 and 7 illustrate an embodiment of the invention alternative to that illustrated in Figure 5.
Figure 7:
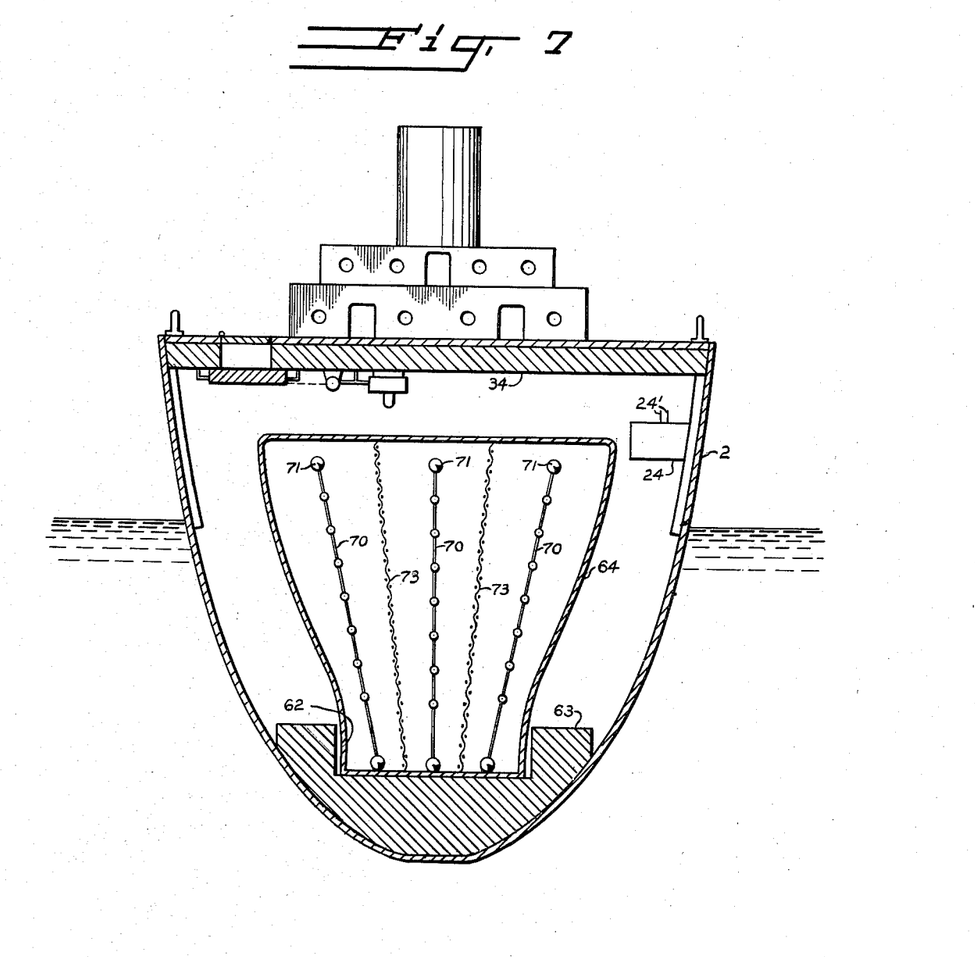

The embodiment of the invention illustrated in Figures 6 and 7 employs the same motor control circuit illustrated in Figure 4 for control of the liquid level in the arms 64, 65 and 66 and for preventing opening of the hatchways when the radiation level in the hold is at a dangerous level.

Figure 8:
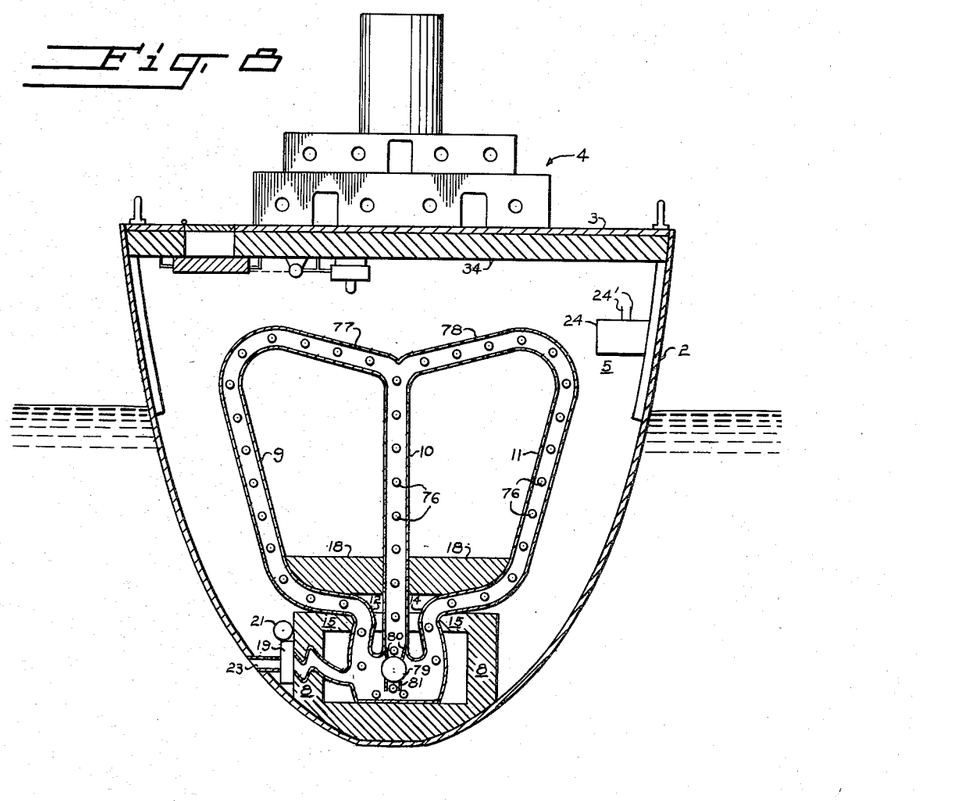
Figures 8 and 9 illustrate another embodiment of the apparatus of the present invention.

In the two embodiments of the invention thus far described, the radio-active material is disposed in capsules 31 secured to strings which are raised to a food irradiating position by floatation in water. In still another embodiment of the invention, illustrated in Figures 8 and 9 of the accompanying drawings, the strings of capsules are eliminated and the radio-active material is disposed in spherical capsules 76 each having a density approximately equal to that of water, which capsules are circulated through the apparatus by means of water flow. Referring specifically to Figure 8 of the accompanying drawings, wherein elements common to Figure 1 carry the same reference numerals as in Figure 1, a container 7 is disposed in a block 8 of shielding material. Three hollow pipes 9, 10 and 11 are connected to the container 7 through S-shaped members 12, 14 and 13 respectively, the S-shaped member 14 not being illustrated in Figure 8 since it lies in a place perpendicular to the plane of the paper. The inwardly directed peripheral flange 15 of the block 8 engages the concave surfaces of the upper bends of the S-shaped members 12, 13 and 14 and together with the plate 18 prevent dangerous emanations from entering the hold 5 when it is desired to render the hold 5 safe for personnel.

Figure 9:
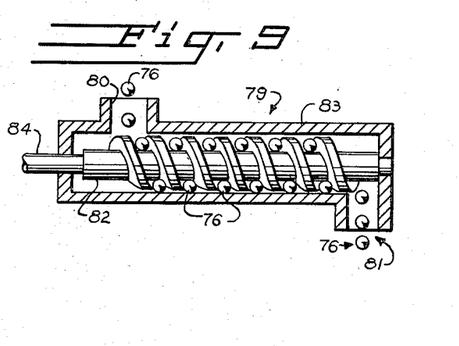

In accordance with the present embodiment of the invention, the upper ends of the arms 9 and 11 are connected to the pipe 10 through downwardly sloping pipes 77 and 78 respectively, and a pump 79 is disposed in and centrally of the container 7. The pump 79 has an inlet port 80 connected by a water-tight coupling to the lower end of the pipe 10 and has an outlet port 81 directed downwardly toward the bottom of the container 7. The pump may employ an Archimedes screw 82 disposed within the internal bore of a casing 83 as illustrated in Figure 9. The diameter of the bore of the casing 83 and of the threaded portions of the Archimedes screw 82 are of approximately the same diameter while the difference in diameters between the threads and the shaft of the screw 82 is slightly greater than the diameter of the capsules 76. The Archimedes screw 82 is mounted on a shaft 84 which extends through the wall of the container 7 and is driven by a conventional source of rotary motion, not illustrated. Although the pump 79 is described as one employing the principle of the Archimedes screw, it is not intended to limit the invention to a particular type of pump; other types of pumps being equally well adapted to utilization in the system.

Upon filling of the container 7 and arms 9, 10 and 11 and pipes 77 and 78 with water, the pump 79 is activated and draws water at a high velocity from the arm 10 and returns it through the container 7 and arms 9 and 11 and pipes 77 and 78, to the pipe 10. The force of the water circulated by pump 79 is sufficient to pick up the capsules 76 and circulate them through the system with the water; this being possible because the capsules 76 are approximately of the same density as water and, therefore, circulated with the water. The capsules 76 pass through the pumps 79 and since the outlet port 81 of the pump 79 is directed downwardly, the capsules 76 divide equally, over a period of time, between the arms 9 and 11. To insure an even distribution of the capsules 76 throughout the system, the arms 9, 10 and 11 and pipes 77 and 78 may be of a smaller diameter than two of the capsules although this is not essential since after several circulations of the water through the system, the capsules become equally distributed because of the random nature in which they are picked up by the water. When it is desired to render the system safe, the pump 19 is activated and drains the water from the system. The capsules 76 in the arms 9 and 11 roll down the arms into the container 7 while the capsules 76 in the pipes 77 and 78 and arm 10 are drawn into the pump 79 and pass therethrough to the container 7.

The continuous circulation of the capsules 76 through the system establishes, timewise, a substantially uniform field pattern of emanations in the hold 5 of the vessel 1, thereby insuring adequate treatment of the foodstuffs. In order to treat foodstuffs at all locations in the hold, several of the equipments illustrated in Figure 8 may be disposed along the length of the hold 5, such an arrangement being similar to that illustrated in Figure 5. Also, a single station may be employed by providing a plurality of pipes all connected to one or more pipes disposed centrally of the longitudinal dimension of the vessel and which feed the inlet of one or more recirculation pumps.

In all embodiments of the present invention, regardless of the means employed for raising the radio-active material to a food or other material treating position or the arrangement of arms or pipes employed for insuring adequate distribution of the radio-active material throughout the hold 5, the system is rendered safe by draining the water from the system. No moving parts, except the pump 19 and motor 21, are required and, consequently, the system is simple and reliable. Not only does the simplicity and reliability of the system reduce danger to the ship's personnel but it is inexpensive to maintain and requires little maintenance after installation. Further, the present invention insures adequate treatment of the foodstuffs even though low activity radio-active material is employed since adequate time for treatment is provided during movement of the ship from its point of departure to its destination. The utilization of low activity radio-active material, the inherent shielding provided by the water through which the vessel proceeds, and the location of the container 7 below the water line of the vessel 1, minimizes the problem of adequately shielding the radio-active material. Further, the novel combination of a cargo vessel equipped with apparatus for irradiating foodstuffs carried thereby eliminates all lost time and consequent economic loss normally encountered in detouring foodstuffs to a plant equipped to provide such treatment.

While I have described and illustrated several specific embodiments of the present invention, it will be clear that variations of the specific details of construction may be resorted to without departing from the true spirit of the invention as defined in the appended claims.

What I claim is:

1. In combination a cargo vessel having a deck, a cargo compartment defined in part by said deck, shielding means disposed within said compartment and positioned adjacent to and coextensive with the portion of said deck defining said compartment, a container disposed below the water line of said vessel, a plurality of hollow members communicating with the interior of said container and extending through said compartment to spaced locations therein, a plurality of discrete bodies of radio-active material disposed in said container, means for distributing said discrete bodies throughout said hollow members to effect irradiation of the cargo in said compartment, said shielding means preventing harmful emanations from passing through said deck, means for returning said discrete bodies to said container to terminate treatment of the cargo and means for preventing harmful emanations from the radio-active material from entering said compartment upon return of the discrete bodies to said container.

2. In an apparatus for irradiating substances, a cargo vessel having a deck, a cargo compartment defined in part by said deck, shielding means for radio-activity secured to said deck, the substances to be irradiated being disposed in said cargo compartment, a plurality of discrete bodies of radio-active material, means for distributing said discrete bodies throughout said compartment of said vessel to irradiate said substances, said shielding means preventing harmful emanations from passing through said deck, and means for terminating the treatment of the foodstuffs, said last mentioned means including means for concentrating said discrete bodies at at least one predetermined location below the water line of said vessel.

3. In an apparatus for irradiating foodstuffs, a cargo vessel having a deck, a cargo compartment defined in part by said deck, shielding means for radio-activity secured to said deck, the foodstuffs being disposed in said cargo compartment, a plurality of discrete bodies of radio-active material, means for distributing said discrete bodies throughout said compartment of said vessel to irradiate the foodstuffs, said shielding means preventing harmful emanations from passing through said deck, means for concentrating said discrete bodies at a predetermined location below the water line of said vessel to terminate irradiation of the foodstuffs and immovable means for preventing harmful emanations from said discrete bodies from entering said compartment upon return of said discrete bodies to said location.

4. In an apparatus for irradiating foodstuffs, a cargo vessel having a deck, a cargo compartment defined in part by said deck, shielding means for radio-activity secured to said deck, a plurality of discrete bodies of radio-active material, single means for distributing said discrete bodies throughout said compartment of said vessel to irradiate the foodstuffs and for concentrating said discrete bodies in at least one predetermined location below the water line of said vessel to terminate the irradiation of the foodstuffs and immovable means for preventing harmful emanations from said discrete bodies from entering said compartment upon return of said discrete bodies to said location.

5. In combination a cargo vessel having a deck, a cargo compartment defined in part by said deck, shielding means for radio-activity disposed within said compartment and positioned adjacent to and coextensive with the portion of said deck defining said compartment, a container disposed below the water line of said vessel, a plurality of hollow members communicating with the interior of said container and extending through said compartment to spaced locations therein, a plurality of discrete bodies of radio-active material disposed in said container, single means for distributing said discrete bodies throughout said hollow members to effect irradiation of materials disposed in said cargo compartment and for returning said discrete bodies to said container to terminate treatment of the materials in said compartment, and immovable means for preventing harmful emanations from the radio-active material from entering said compartment upon return of the discrete bodies to said container.

6. In an apparatus for irradiating materials, a cargo vessel having a deck and a cargo compartment defined in part by said deck, the materials to be irradiated being disposed in said cargo compartment, first shielding means, for emanations from radio-active material, disposed on at least one side by said deck adjacent to and coextensive with the section of said deck defining said cargo compartment, a container located in said compartment below the water line of said vessel, a plurality of hollow members communicating with the interior of said container and extending through the materials to be irradiated to spaced locations in said compartment, a plurality of discrete bodies of radio-active material disposed within said container, means for distributing said discrete bodies throughout said hollow members to establish a predetermined pattern of emanations from said discrete bodies in said compartment to irradiate the materials, means for returning said discrete bodies to said container to terminate irradiation of the materials and immovable shielding means for preventing dangerous emanations from entering said compartment when said discrete bodies are disposed in said container.

7. The combination in accordance with claim 6 comprising at least one hatchway communicating with said compartment said first shielding means having an aperture aligned with said hatchway, a movable shielding plate arranged and adapted to close said aperture in a first position and to open said aperture in a second position, means for moving said shielding plate from one to the other of said positions and detector means for preventing movement of said shielding plate from said first to said second position when the level of radio-activity in said compartment is above a predetermined level.

8. The combination in accordance with claim 6 wherein said means for distributing includes means for filling said container and said hollow members with water and said means for returning includes means for draining the water from said container and said hollow members.

9. The combination in accordance with claim 8 including a plurality of thread-like members at least equal in number to the number of said hollow members, said discrete bodies being secured at spaced locations along said thread-like members, said thread-like members having one end maintained in said container and means for rendering said thread-like members buoyant in water.

10. The combination in accordance with claim 8 wherein said discrete bodies have approximately the same density as water and wherein the ends of said hollow members remote from said container are interconnected by sloping hollow members and pump means for circulating said water and said discrete bodies through said hollow members.

11. The combination in accordance with claim 6 wherein said immovable shielding means comprises curved members for connecting said hollow members to said container, a body of shielding material disposed in the bottom of said compartment and having a centrally disposed aperture, said container being positioned in said aperture, said body of shielding material extending into contact with concave surfaces of said curved members and shielding plate means disposed above and adjacent to said body of shielding material over the aperture therein.

12. In combination a cargo vessel having a deck, a cargo compartment disposed below said deck, shielding means for radio-active emanations disposed between said compartment and said deck, said shielding means being of sufficient extent to shield all of said deck from harmful emanations, a container disposed below the water line of said vessel, a plurality of hollow members communicating with the interior of said container and extending through said compartment to spaced locations therein, a plurality of discrete bodies of radio-active material disposed throughout said hollow members to effect irradiation of the cargo in said compartment, said shielding means preventing harmful emanations from passing through said deck, means for returning said discrete bodies to said container to terminate treatment of the cargo and means for preventing harmful emanations from the radio-active material from entering said compartment upon return of the discrete bodies to said container.

References Cited in the file of this patent

FOREIGN PATENTS 1,079,640     France _________________ May 19, 1954

OTHER REFERENCES

Nuclear Engineering, part II, vol. 50, 1954. (Published by American Institute of Chemical Engineers, pages 201–207 relied on.)